United States Patent
Schroll et al.

(10) Patent No.: US 11,011,875 B1
(45) Date of Patent: May 18, 2021

(54) ELECTRICAL CABLE BRAID POSITIONING CLIP

(71) Applicant: TE Connectivity Services GmbH, Schaffhausen (CH)

(72) Inventors: Neil Franklin Schroll, Mount Joy, PA (US); Nathan William Swanger, Dillsburg, PA (US)

(73) Assignee: TE Connectivity Services GmbH

( * ) Notice: Subject to any disclaimer, the term of this patent is extended or adjusted under 35 U.S.C. 154(b) by 0 days.

(21) Appl. No.: 16/708,532

(22) Filed: Dec. 10, 2019

(51) Int. Cl.
*H01R 13/6592* (2011.01)
*H01R 43/28* (2006.01)
*H02G 15/02* (2006.01)

(52) U.S. Cl.
CPC ......... *H01R 13/6592* (2013.01); *H01R 43/28* (2013.01); *H02G 15/02* (2013.01)

(58) Field of Classification Search
CPC .. H01R 9/0518; H01R 13/6592; H01R 43/28; H01R 15/02
USPC ........................................................ 439/585
See application file for complete search history.

(56) References Cited

U.S. PATENT DOCUMENTS

| | | | | |
|---|---|---|---|---|
| 3,290,640 A * | 12/1966 | Forney, Jr. | ........... | H01R 24/566 439/198 |
| 5,102,351 A * | 4/1992 | Meshel | ................... | H01R 9/032 439/585 |
| 5,722,855 A * | 3/1998 | Kanda | .................. | H01R 24/566 439/578 |
| 9,281,598 B2 | 3/2016 | Zebhauser et al. | | |
| 9,941,608 B2 | 4/2018 | Zebhauser et al. | | |
| 10,249,995 B2 | 4/2019 | Zebhauser et al. | | |
| 10,347,397 B2 | 7/2019 | Armbrecht et al. | | |
| 10,389,062 B2 | 8/2019 | Zebhauser et al. | | |
| 10,396,472 B2 | 8/2019 | Baldauf et al. | | |
| 10,553,977 B2 | 2/2020 | Pemwieser et al. | | |
| 10,594,104 B2 * | 3/2020 | Hofling | ................. | H01R 43/05 |
| 2005/0126062 A1 * | 6/2005 | Ghisoni | .................... | F41C 3/14 42/65 |
| 2015/0132994 A1 | 5/2015 | Zebhauser et al. | | |
| 2017/0040087 A1 | 2/2017 | Armbrecht et al. | | |
| 2018/0366856 A1 | 12/2018 | Pemwieser et al. | | |
| 2019/0058296 A1 | 2/2019 | Bredbeck | | |
| 2019/0148865 A1 | 5/2019 | Zebhauser et al. | | |

* cited by examiner

*Primary Examiner* — Gary F Paumen

(57) ABSTRACT

A cable assembly and method for terminating an end of a cable. The cable assembly includes a ferrule secured to a cable jacket at the end of the cable. The cable also has a braided shield which extends from the end of the cable to the portion of the inner connector positioned in the ferrule. A transition zone is provided between the end of the cable and an end of a portion of an inner connector positioned in the ferrule. A braid positioning clip engages the braided shield in the transition zone to maintain a relationship of the braided shield to the signal conductors to minimize the degradation of the electrical performance of the cable.

22 Claims, 3 Drawing Sheets

ELECTRICAL CABLE BRAID POSITIONING CLIP

FIELD OF THE INVENTION

The present invention is directed to an electrical cable braid positioning clip. In particular, the invention is directed to a clip which cooperates with the braid of an electrical cable to retain the braid relationship to the signal conductor.

BACKGROUND OF THE INVENTION

In the process of terminating a high speed cable, such as an RF (Radio Frequency) cable, to a connector, there are many electrical and mechanical considerations. Typical highspeed cable consists of an outer jacket, braid (for ground reference), foil, dielectric, and an inner signal conductor. Connecting the braid for ground reference is always a challenge for both mechanical and electrical performance. Not only is the mechanical connection difficult, but trying to also maintain electrical performance through the braid crimp zone is sometime problematic. The crimping process usually involves the use of a mechanical component, like a ferrule. When crimping the ferrule over the braid, foil, and inner connector there is a transition zone where the connector ends. In this zone the braid and foil may get "bunched" up causing electrical performance degradation.

It would, therefore, be beneficial to provide a device or clip which eliminates the "bunching" up of the foil and braid, thereby maintaining the appropriate relationship of the braid to the signal conductor to minimize the degradation of the electrical performance of the cable.

SUMMARY OF THE INVENTION

An embodiment is directed to a cable assembly for terminating an end of a cable. The cable assembly includes a ferrule secured to a cable jacket at the end of the cable. A shell has an inner connector, with a portion of the inner connector positioned in the ferrule. An inner housing is positioned in the inner connector. The inner housing cooperates with individual signal conductors which extend from the end of the cable. The cable has the individual signal conductors extending from the end of the cable to the inner housing. The cable also has a braided shield which extends from the end of the cable to the portion of the inner connector positioned in the ferrule. A transition zone is provided between the end of the cable and an end of the portion of the inner connector positioned in the ferrule. A braid positioning clip engages the braided shield in the transition zone to maintain a relationship of the braided shield to the signal conductors to minimize the degradation of the electrical performance of the cable.

An embodiment is directed to a method of terminating a cable to a cable assembly. The method includes; removing a cable jacket at the end of the cable to expose signal conductors and a braided shield; positioning the signal conductors into a conductive shell; positioning the braided shield in electrical engagement with the conductive shell; a shell having an inner connector, a portion of the inner connector positioned in the ferrule; positioning a braid positioning clip in a transition zone between the end of the cable and the conductive shell; and maintaining a relationship of the braided shield to the signal conductors in the transition zone to minimize the degradation of the electrical performance of the cable.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
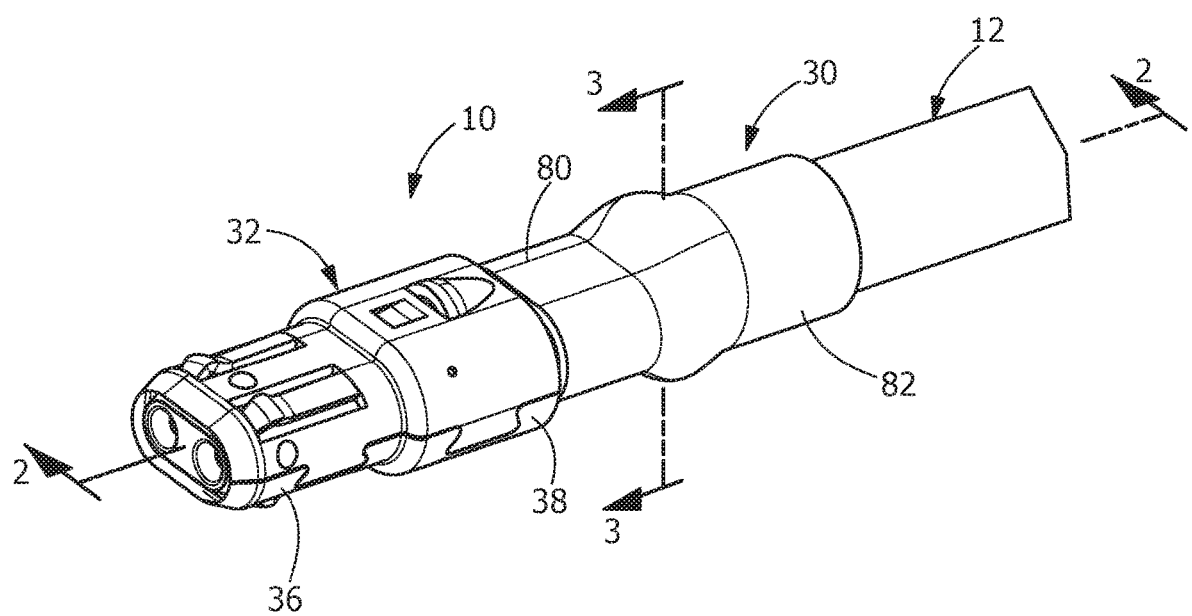
FIG. 1 is a side view of an illustrative electrical connector positioned on an illustrative cable.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
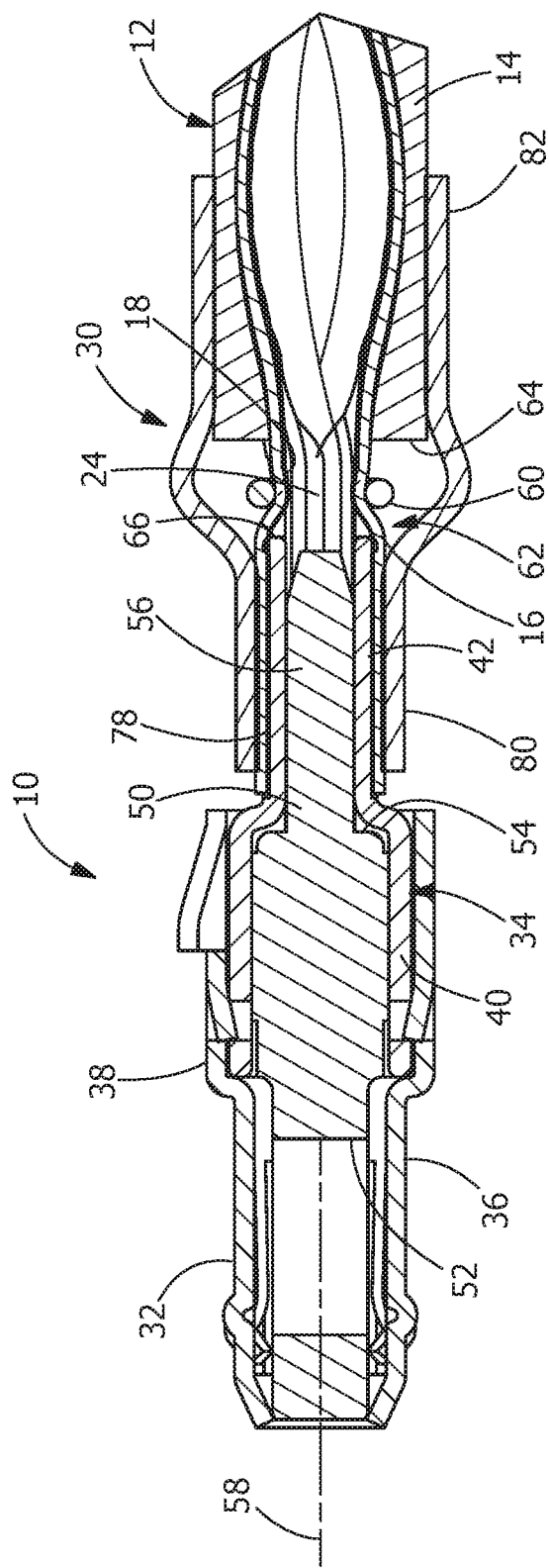
FIG. 2 is a cross-section view taken along line 2-2 of FIG. 1 showing a clip of the present invention in contact with the braid of the cable in a transition zone.
Figure 3:
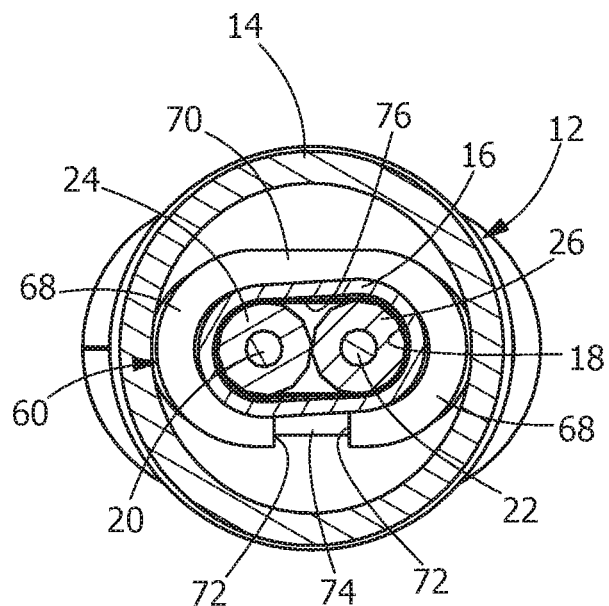
FIG. 3 is an enlarged cross-section view taken along line 3-3 of FIG. 1 showing a clip of the present invention in contact with the braid of the cable in the transition zone.

As shown in FIGS. 1 through 3, an electrical connector assembly 10 is electrically and mechanically connected to a cable 12. The cable 12 can transfer data between and among storage devices, switches, routers, printed circuit boards (PCBs), analog to digital converters, connectors, and other devices. In various embodiments, the cable 12 can support data transfer rates of 100 Mbps and higher. In some embodiments, the cable 12 can support data transfer rates of approximately 4.25 Gbps to approximately 25 Gbps. The cable 12 also can be used with data transfer rates above or below these exemplary rates. As shown in FIG. 3, the cable 12 has a cable jacket 14, a braided shield 16, a metalized foil 18 and two center conductors 20, 22. The conductors 20, 22 are spaced from each other and extend essentially parallel to each other. The conductors 20, 22 are surrounded by the braided metal shield 16, such as, but not limited to braided copper shielding. The center conductors 20, 22 may also be surrounded by individual dielectrics 24, 26.

As shown in FIG. 2, an end of the cable 12 has the cable jacket 14 removed to expose the braided shield 16 and the conductors 20, 22. A crimp ferrule 30 is provided proximate the end of the cable 12.

The electrical connector assembly 10 has a first metallic outer shell 32 and a second metallic outer shell 34. The first metallic outer shell 32 has a mating connector receiving portion 36 and a second metallic outer shell receiving portion 38. The second metallic outer shell 34 has a first metallic outer shell receiving portion 40 and a conductor receiving portion 42.

A dielectric housing 50 is positioned in the electrical connector assembly 10. The housing 50 made of dielectric material. As shown in FIG. 2, the housing 50 has a mating end 52 and an oppositely facing conductor receiving end 54. A dielectric rib 56 extends from the conductor receiving end 54 of the dielectric housing 50 in a direction away from the mating end 52. The rib 56 extends in a direction which is essentially parallel to a longitudinal axis 58 of the housing 50.

The rib 56 extends from the conductor receiving end 54 into the conductor receiving portion 42 of the second metallic outer shell 34. The rib 56 and the second metallic outer shell 34 form conductor receiving passages (not shown).

Figure 4:
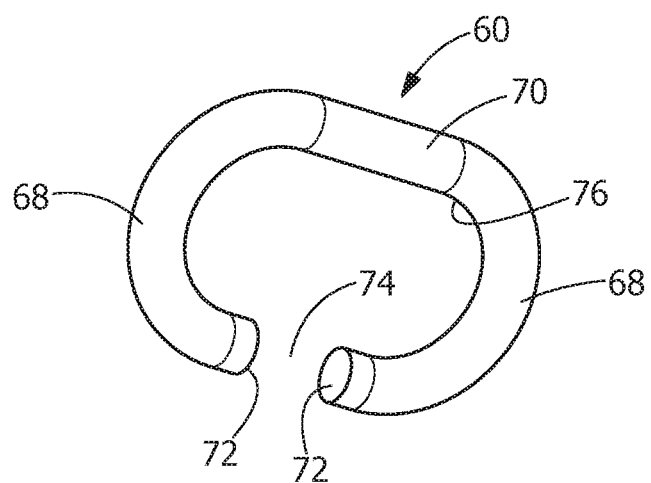
FIG. 4 is a perspective view an illustrative embodiment of the clip of the present invention.

As shown in FIGS. 2 through 4, a braid positioning clip or comb 60 is provided proximate the end of the cable 12. The braid positioning clip 60 is positioned in a transition zone 62 between an end 64 of the cable jacket 14 and an end 66 of the conductor receiving portion 42 of the second metallic outer shell 34. The illustrative braid positioning clip or comb 60 has a C-shape with an inner surface 76. The positioning clip 60 has two curved or arcuate sections 68 and a straight section 70 which extends between the arcuate sections 68. Each of the arcuate sections 68 have a free end 72 which is positioned in line or in the same plane, but spaced from, the free end 72 of the other arcuate section 68. In an alternate embodiment, the free ends 72 may be positioned in different planes such that the free ends 72 are not positioned in line with each other. A slot or opening 74 is provided between the free ends 72.

In the illustrative embodiment shown, the braid positioning clip 60 is made from material having resilient properties. The braid positioning clip 60 may be made from metal, plastic or any other material having the desired characteristics. The arcuate sections 68 and the straight section 70 may be resiliently deformed as the braid positioning clip 60 is moved to the position shown in FIGS. 2 and 3. With the braid positioning clip 60 properly positioned, the arcuate sections 68 and the straight section 70 are allowed to resiliently return toward their unstressed positions, as will be more fully described.

While the braid positioning clip 60 is shown as a C-shaped member, the braid positioning clip 60 may have other configurations without departing from the scope of the invention. In addition, the braid positioning clip 60 may be made from material which may be deformed, for example by a crimp, rather than material which has resilient characteristics.

In use, the cable 12 is prepared, as discussed above, to remove the cable jacket 14 to expose the braided shield 16 and conductors 20, 22. The crimp ferrule 30 is inserted onto the end of the cable and initially positioned away from the end of the cable, either before or after the cable 12 is prepared. With the crimp ferrule 30 properly inserted over the end of the cable 12 and the cable 12 properly prepared, the connector assembly 10 is moved to the position shown in FIGS. 1 and 2. In this position, the conductors 20, 22 are positioned in the conductor receiving passages between the rib 56 and the conductor receiving portion 42 of the second metallic outer shell 34. The conductors 20, 22 in the conductor receiving passages extend substantially parallel to each other and in substantially the same plane. As the second metallic outer shell 34 surrounds the conductors 20, 22, the conductors 20, 22 are protected, preventing damage to the conductors 20, 22, thereby maintaining the integrity of the conductors 20, 22 and the signal path provided thereby.

In this position, the braided shield 16 and the metalized foil 18 extend over an outside surface 78 of the conductor receiving portion 42 of the second metallic outer shell 34. The braid positioning clip 60 is positioned over the braided shield 16 and the metalized foil 18 in the transition zone 62 to retain the braided shield 16 and the metalized foil 18 in close proximity to the conductors 20, 22.

The braid positioning clip 60 helps to contain and maintain the braided shield 16 and the metalized foil 18 relationship to the signal conductor 20, 22, particularly in the transition zone 62. The inner surface 76 of the braid positioning clip 60 is dimensioned to contain or compress the braided shield 16 and the metalized foil 18 against the conductors 20, 22. Consequently, as the braid positioning clip 60 is inserted over the braided shield 16 and the metalized foil 18 in the transition zone 62, the braided shield 16 and the metalized foil 18 are maintained in close proximity to the inner signal conductors 20, 22, thereby eliminating bunching of the braided shield 16 and the metalized foil 18 in the transition zone 62. In the illustrative embodiment shown, the braid positioning clip 60 maintains the relationship between the braided shield 16 and the metalized foil 18 and the conductors 20, 22 via a spring action. However, in other illustrative embodiments, the braid positioning clip 60 retains the braided shield 16 and the metalized foil 18 against the conductors 20, 22 by other methods or means. For example, the braid positioning clip 60 may be crimped to properly retain the braided shield 16 and the metalized foil 18 against the conductors 20, 22, or even another crimp process. As the braid positioning clip 60 maintains the relationship between the braided shield 16 and the metalized foil 18 and the inner signal conductors 20, 22, degradation of the electrical performance of the cable is minimized, thereby enhancing the electrical performance.

With the braid positioning clip 60 properly positioned, the crimp ferrule 30 is then moved into the position shown in FIG. 2. A first portion 80 of the crimp ferrule 30 is crimped to the conductor receiving portion 42 of the second metallic outer shell 34 of the connector assembly 10. This causes the braided shield 16 and the metalized foil 18 to be placed in mechanical and electrical engagement with the outside surface 78 of the conductor receiving portion 42 of the second metallic outer shell 34, providing for a continuous electrical connection between the braided shield 16 and the metalized foil 18 of the cable and the second metallic outer shell 24 of the connector assembly 10. A second portion 82 of the crimp ferrule 30 is crimped to the cable jacket 14 of the cable 12 to provide a mechanical connection therebetween. The crimp ferrule 30 secures the electrical connector assembly 10 to the cable 12.

As previously stated, the method of terminating a cable to a cable assembly includes; removing a cable jacket at the end of the cable to expose signal conductors and a braided shield; positioning the signal conductors into a conductive shell; positioning the braided shield in electrical engagement with the conductive shell; a shell having an inner connector, a portion of the inner connector positioned in the ferrule; positioning a braid positioning clip in a transition zone between the end of the cable and the conductive shell; and maintaining a relationship of the braided shield to the signal conductors in the transition zone to minimize the degradation of the electrical performance of the cable.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A cable assembly for terminating an end of a cable, the cable assembly comprising:
    a ferrule secured to a cable jacket at the end of the cable;
    a shell, a portion of the shell positioned in the ferrule;
    an inner housing positioned in the shell, the inner housing cooperating with individual signal conductors which extend from the end of the cable;
    the cable having the individual signal conductors extending from the end of the cable to the inner housing and a braided shield extending from the end of the cable to the portion of the shell positioned in the ferrule;
    a transition zone provided between the end of the cable and an end of the portion of the shell positioned in the ferrule;
    a braid positioning clip engaging the braided shield in the transition zone to maintain a relationship of the braided shield to the signal conductors to minimize the degradation of the electrical performance of the cable.

2. The cable assembly as recited in claim 1, wherein the braid positioning clip has an arcuate section and a straight section.

3. The cable assembly as recited in claim 1, wherein the braid positioning clip has two arcuate sections and a straight section which extends between the arcuate sections.

4. The cable assembly as recited in claim 3, wherein the arcuate sections have free ends which are positioned in line, but spaced from each other.

5. The cable assembly as recited in claim 4, wherein a slot is provided between the free ends.

6. The cable assembly as recited in claim 3, wherein the arcuate sections have free ends which are positioned in different planes.

7. The cable assembly as recited in claim 1, wherein the braid positioning clip is resiliently deformable.

8. The cable assembly as recited in claim 7, wherein the braid positioning clip has a C-shaped configuration.

9. The cable assembly as recited in claim 7, wherein the braid positioning clip is made from metal.

10. The cable assembly as recited in claim 7, wherein the braid positioning clip is made from plastic.

11. The cable assembly as recited in claim 7, wherein an inner surface of the braid positioning clip is dimensioned to contain or compress the braided shield against the signal conductors, allowing the braid positioning clip to maintain the braided shield in close proximity to the inner signal conductors.

12. A method of terminating a cable to a cable assembly, the method comprising;
    removing a cable jacket at the end of the cable to expose signal conductors and a braided shield;
    positioning the signal conductors into a conductive shell;
    positioning the braided shield in electrical engagement with the conductive shell;
    positioning a braid positioning clip in a transition zone between the end of the cable and the conductive shell;
    maintaining a relationship of the braided shield to the signal conductors in the transition zone to minimize the degradation of the electrical performance of the cable.

13. The method as recited in claim 12, wherein the braid positioning clip has an arcuate section and a straight section.

14. The method as recited in claim 12, wherein the braid positioning clip has two arcuate sections and a straight section which extends between the arcuate sections.

15. The method as recited in claim 14, wherein the arcuate sections have free ends which are positioned in line, but spaced from each other.

16. The method as recited in claim 15, wherein a slot is provided between the free ends.

17. The method as recited in claim 14, wherein the arcuate sections have free ends which are positioned in different planes.

18. The method as recited in claim 12, wherein the braid positioning clip is resiliently deformable.

19. The method as recited in claim 12, wherein the braid positioning clip has a C-shaped configuration.

20. The method as recited in claim 12, wherein the braid positioning clip is made from metal.

21. The method as recited in claim 12, wherein the braid positioning clip is made from plastic.

22. The method as recited in claim 12, wherein an inner surface of the braid positioning clip is dimensioned to contain or compress the braided shield against the signal conductors, allowing the braid positioning clip to maintain the braided shield in close proximity to the inner signal conductors.

* * * * *